(12) United States Patent
Watanabe

(10) Patent No.: US 8,970,946 B2
(45) Date of Patent: Mar. 3, 2015

(54) OPTICAL SIGNAL PROCESSING APPARATUS, OPTICAL RECEIVING APPARATUS, AND OPTICAL RELAY APPARATUS

(75) Inventor: Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 642 days.

(21) Appl. No.: 13/173,230

(22) Filed: Jun. 30, 2011

(65) Prior Publication Data

US 2011/0255874 A1    Oct. 20, 2011

Related U.S. Application Data

(62) Division of application No. 12/232,684, filed on Sep. 22, 2008, now Pat. No. 8,243,363.

(30) Foreign Application Priority Data

Jan. 25, 2008   (JP) .................................. 2008-015593

(51) Int. Cl.
| | |
|---|---|
| H04B 10/17 | (2006.01) |
| H04B 10/299 | (2013.01) |
| G02F 1/39 | (2006.01) |
| H04B 10/12 | (2006.01) |
| G02F 1/35 | (2006.01) |
| H01S 3/067 | (2006.01) |
| H01S 3/10 | (2006.01) |

(52) U.S. Cl.
CPC ............ *H04B 10/299* (2013.01); *G02F 1/3536* (2013.01); *G02F 1/395* (2013.01); *G02F 2001/392* (2013.01); *H01S 3/06754* (2013.01); *H01S 3/10015* (2013.01); *H01S 3/10061* (2013.01)
USPC ........................ 359/337.5; 359/341.3; 385/22

(58) Field of Classification Search
CPC ......... G02F 1/39; G02F 1/395; G02F 1/3536; G02F 2001/3507; G02F 2201/16; H01S 3/06758; H04N 10/299
USPC .................. 359/337.5, 341.1, 341.3; 385/122
See application file for complete search history.

(56) References Cited

U.S. PATENT DOCUMENTS

| | | |
|---|---|---|
| 5,432,632 A | 7/1995 | Watanabe |
| 5,530,584 A | 6/1996 | Myslinski |

(Continued)

FOREIGN PATENT DOCUMENTS

| | | |
|---|---|---|
| EP | 1389742 | 2/2004 |
| EP | 1633066 | 3/2006 |

(Continued)

OTHER PUBLICATIONS

Notice of Allowance mailed Sep. 26, 2011 in U.S. Appl. No. 12/232,684.

(Continued)

*Primary Examiner* — Eric Bolda
(74) *Attorney, Agent, or Firm* — Staas & Halsey LLP

(57) ABSTRACT

An optical signal processing apparatus includes an input unit to which signal light is input; a wave coupling unit that couples the signal light from the input unit and pump light having a waveform different from that of the signal light; a first nonlinear optical medium that transmits light coupled by the wave coupling unit, the light being the signal light and the pump light; a dispersion medium that transmits the light that has been transmitted through the first nonlinear optical medium; and a second nonlinear optical medium that transmits the light that has been transmitted through the dispersion medium.

11 Claims, 11 Drawing Sheets

(56) References Cited

U.S. PATENT DOCUMENTS

| | | | |
|---|---|---|---|
| 5,596,436 | A | 1/1997 | Sargis et al. |
| 5,596,667 | A | 1/1997 | Watanabe |
| 6,049,642 | A | 4/2000 | Nakamura et al. |
| 6,101,024 | A | 8/2000 | Islam et al. |
| 6,222,658 | B1 | 4/2001 | Dishman et al. |
| 6,407,843 | B1 | 6/2002 | Rowan et al. |
| 6,522,818 | B1 | 2/2003 | Aso et al. |
| 6,529,314 | B1 | 3/2003 | Shukunami et al. |
| 6,529,315 | B2 | 3/2003 | Bartolini et al. |
| 6,771,864 | B2 | 8/2004 | Kubo et al. |
| 6,922,503 | B2 | 7/2005 | Hasegawa |
| 6,959,135 | B1 | 10/2005 | Bickham |
| 7,292,792 | B2 | 11/2007 | Chen et al. |
| 7,343,065 | B2 | 3/2008 | Maeda |
| 7,526,211 | B2 | 4/2009 | Mcnicol et al. |
| 2002/0041435 | A1 | 4/2002 | Krummrich |
| 2002/0057880 | A1 | 5/2002 | Hirano et al. |
| 2002/0114061 | A1 | 8/2002 | Naito et al. |
| 2002/0176183 | A1 | 11/2002 | Erz |
| 2004/0005153 | A1 | 1/2004 | Watanabe |
| 2004/0066550 | A1 | 4/2004 | Jay |
| 2004/0190909 | A1 | 9/2004 | Akasaka et al. |
| 2005/0111499 | A1 | 5/2005 | Tanaka |
| 2006/0045445 | A1 | 3/2006 | Watanabe |
| 2006/0051100 | A1 | 3/2006 | Watanabe |
| 2008/0080856 | A1 | 4/2008 | Kagawa |
| 2008/0298813 | A1 | 12/2008 | Song et al. |
| 2010/0021105 | A1 | 1/2010 | Watanabe |
| 2010/0183303 | A1 | 7/2010 | Okabe et al. |
| 2010/0254649 | A1 | 10/2010 | Schofield |

FOREIGN PATENT DOCUMENTS

| | | |
|---|---|---|
| EP | 1811703 | 7/2007 |
| EP | 1830224 | 9/2007 |
| EP | 2031784 | 3/2009 |
| EP | 2199846 A1 | 6/2010 |
| JP | 08-029817 | 2/1996 |
| JP | 2000-031901 | 1/2000 |
| JP | 2000-049703 | 2/2000 |
| JP | 2001-183711 | 7/2001 |
| JP | 3436310 | 6/2003 |
| JP | 2006-184851 | 7/2006 |
| JP | 2007-047828 | 2/2007 |
| JP | 2007-133426 | 5/2007 |
| WO | WO 94/09403 | 4/1994 |
| WO | WO 2009/047856 | 4/2009 |

OTHER PUBLICATIONS

Extended European Search Report, mailed May 18, 2009, in corresponding European Patent Application No. 08164874.3.

Office Action mailed Mar. 4, 2011 in U.S. Appl. No. 12/232,684.

Office Action mailed Dec. 16, 2010 in U.S. Appl. No. 12/232,684.

U.S. Appl. No. 12/232,684, filed Sep. 22, 2008, Shigeki Watanabe, Fujitsu Limited.

Notice of Allowance mailed May 21, 2012, in U.S. Appl. No. 12/232,684.

Notice of Allowance mailed Nov. 10, 2014 in related U.S. Appl. No. 13/431,710 (10 pages).

U.S. Appl. No. 12/232,684, filed Sep. 22, 2008, Shigeki Watanabe.

U.S. Appl. No. 13/431,710, filed Mar. 27, 2012, Shigeki Watanabe.

U.S. Appl. No. 13/067,283, filed May 20, 2011, Shigeki Watanabe.

Japanese Office Action dated Jan. 14, 2014 in a related corresponding Japanese Patent Application No. 2010-191694 (2 pages) (2 pages English Translation).

European Extended Search Report mailed Mar. 18, 2013 in a related corresponding Patent Application No. 11168205.0. (7 pages).

International Search Report dated Dec. 22, 2009 in a related corresponding PCT Application No. PCT/JP2009/068703 (4 pages).

"*A new high bit rate orthogonal IM/FSK scheme based on an all fiber realization, for AOLS applications*", Skarmoutsos et al., ECOC Proceedings, 2005.09, vol. 3, pp. 683-684.

"*All-Optical Label Swapping Networks and Technologies*", Blumenthal et al., Journal of Lightwave Technology, 2000. 12, vol. 18, No. 12, pp. 2058-2075.

Extended European Search Report mailed May 22, 2013 for a related corresponding European Application No. 09850854.2. (8 pages).

S. Watanabe et al., "*Simultaneous Wavelength Conversion and Optical Phase Conjugation of 200 Gb/s(5x40 Gb/s) WDM Signal Using a Highly Nonlinear Fiber Four-wave Mixer*", ICOC-ECOC, vol. 5, 22-25 Sep. 1997, 11[th]International Conference on Integrated Optics and Optical Fibre Communications/23[rd]European Conference on Optical Communications, IEEE Conference Publication XP006508700, ISBN: 978-0-85296-697-6, pp. 1-4.

D.M. Forin et al., "Ultrawide bandwidth A-converter with regeneration properties based on cross phase modulation effect in highly non linear dispersion flattened fiber", Optical Fiber Communication (OFC 2007), Collocated National Fiber Optic Engineers Conference, Mar. 25-29, 2007, XP031146401, ISBN: 978-1-55752-831-5, 3 pp.

G. Contestabile et al., "Double-Stage Cross-Grain Modulation in SOAs: An Effective Technique for WDM Multicasting", IEEE Photonics Technology Letters, vol. 18, No. 1, Jan. 1, 2006, XP55062719, ISSn: 1041-1135, DOI: 10.1109/LPT.2005.861626, pp. 181-183.

Office Action dated Apr. 21, 2014 in related U.S. Appl. No. 13/431,710 (10 pages).

Office Action dated Nov. 7, 2013 in related U.S. Appl. No. 13/067,283 (24 pages).

Office Action dated Mar. 7, 2014 in related U.S. Appl. No. 13/067,283 (13 pages).

Non-Final Office Action dated Jun. 5, 2014 in related U.S. Appl. No. 13/067,283 (9 pages).

Non-Final Office Action dated Aug. 5, 2014 in related U.S. Appl. No. 13/431,710 (16 pages).

(a)　　　　　　　　　(b)

OPTICAL SIGNAL PROCESSING APPARATUS, OPTICAL RECEIVING APPARATUS, AND OPTICAL RELAY APPARATUS

CROSS-REFERENCE TO RELATED APPLICATIONS

This application is a divisional of U.S. Ser. No. 12/232,684, filed Sep. 22, 2008 now U.S. Pat. No. 8,243,363, the entire contents of which are incorporated herein by reference.

This application is based upon and claims the benefit of priority from the prior Japanese Patent Application No. 2008-015593, filed on Jan. 25, 2008, the entire contents of which are incorporated herein by reference.

BACKGROUND OF THE INVENTION

1. Field of the Invention

The present invention relates to signal light amplification utilizing a nonlinear optical effect.

2. Description of the Related Art

Communication apparatuses and communication systems utilizing optical technology have come into wide use as communication capacities and transmission distances have increased. In optical communication, transmission speed (data bit rate), total transmission capacity through a single optical fiber ((transmission rate per channel)×(number of channels)), and transmission distance are limited by waveform distortion or phase distortion of signal light, optical S/N (signal-to-noise) ratio of signal light, etc.

Waveform distortion or phase distortion of signal light is caused by chromatic dispersion (including high-order dispersion and polarization-mode dispersion), nonlinear optical effect, etc., occurring in an optical fiber forming a transmission path. To cope with waveform distortion caused by chromatic dispersion, a transmission path equipped with a normal dispersion fiber and an anomalous dispersion fiber arranged alternately, and a dispersion compensation technique using such a chromatic dispersion compensator as dispersion compensating fiber are employed.

To cope with signal light loss in an optical fiber, a technique using an optical amplifier, such as an optical fiber amplifier, is employed. Optical S/N ratio varies depending on a decrease in power due to signal light loss in an optical fiber line, amplified spontaneous emission (ASE) noises generated from the compensation of signal light loss by optical amplifier, noises generated in a receiver/transmitter, etc.

Today, a problem of grave concern is the realization of long distance transmission of signal light transmitted at a high transmission speed of 40 Gb/s, 100 Gb/s or 160 Gb/s. In high-speed transmission, however, even if a combination of a high-precision chromatic dispersion compensator and a high-quality optical amplifier is provided, reduction in the S/N ratio of signal light remains significant because of residual waveform distortion, phase distortion, and ASE noises generated from the optical amplifier. For this reason, a practical fiber transmission distance of signal light transmitted at 40 Gb/s is limited to several hundred km, and that of signal light transmitted at 160 Gb/s is limited to several km.

For the realization of long distance transmission of such high-speed signal light, it is essential to achieve an optical signal processing apparatus capable of reshaping distorted waveforms and phases, and suppressing accumulated ASE noises and phase noises. To meet this demand, optical signal processing apparatuses that controls the waveform of signal light using an optical limiter function have been disclosed such as those disclosed in, for example, Japanese Patent Application Laid-Open Publication Nos. 2000-31901 and 2000-49703.

The optical signal processing apparatus receives signal light and pump light (pulsed pump light) to a nonlinear optical medium, such as an optical fiber. The optical signal processing apparatus adjusts the relative power of signal light and pump light to saturate signal light gain resulting from a nonlinear optical effect, and thus suppresses noise in signal light having an intensity level of "1".

The conventional optical signal processing apparatus above, however, poses a problem in that when light pulses are used as pulsed pump light, signal light cannot be amplified uniformly if the timing of signal light and the light pulses do not match. Synchronizing the signal light and the light pulses requires a clock recovery circuit, etc. In this case, different clock recovery circuits are needed according to the modulation method, bit rate, pulse width, etc., of the signal light.

Therefore, to cope with multiple types of signal light, multiple clock recovery circuits are needed, which leads to a problem of a larger and more complicated optical signal processing apparatus that invites a cost increase. To solve this problem, continuous light may be used as pump light. However, the efficiency of the occurrence of the nonlinear optical effect depends on the peak power of pump light bringing about a problem in that a large output linear optical amplifier that increases the overall power of continuous light is needed to ensure a sufficient gain by raising the efficiency of occurrence of the nonlinear optical effect.

For example, when an optical fiber is used as a nonlinear optical medium, attempts to increase the power of continuous light causes stimulated Brillion scattering in the optical fiber, thereby resulting in a part of the continuous light being reflected. Therefore, even if the power of the continuous light is increased by using a large output linear optical amplifier, sufficiently increasing the power of continuous light in the optical fiber is difficult, posing a problem in that sufficient gain cannot be ensured when continuous light is used as pump light.

When signal light is in the form of a wavelength-division multiplexed (WDM) signal, signal light in each of channels of the WDM signal arrives in random timing. For this reason, to carry out waveform reshaping of signal light for each channel, the WDM signal must be branched according to channel to reshape the waveform of each branch signal light individually. This requires multiple pump light generating circuits, clock recovery circuits, etc., each respectively corresponding to each channel, thus raising a problem of a larger and more complicated optical signal processing apparatus, inviting cost increases.

SUMMARY OF THE INVENTION

It is an object of the present invention to at least solve the above problems in the conventional technologies.

An optical signal processing apparatus according to one aspect of the present invention includes an input unit to which signal light is input; a wave coupling unit that couples the signal light from the input unit and pump light having a waveform different from that of the signal light; a first nonlinear optical medium that transmits light coupled by the wave coupling unit, the light being the signal light and the pump light; a dispersion medium that transmits the light that has been transmitted through the first nonlinear optical medium; and a second nonlinear optical medium that transmits the light that has been transmitted through the dispersion medium.

An optical receiving apparatus according to another aspect of the present invention includes the optical signal processing apparatus; and a receiving unit that receives the light that has been transmitted by the second nonlinear optical medium of the optical signal processing apparatus.

An optical relay apparatus according to still another aspect of the present invention includes the optical signal processing apparatus; and a receiving unit that receives the light that has been transmitted by the second nonlinear optical medium of the optical signal processing apparatus.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Referring to the accompanying drawings, exemplary embodiments according to the present invention are explained in detail below.

Figure 1:
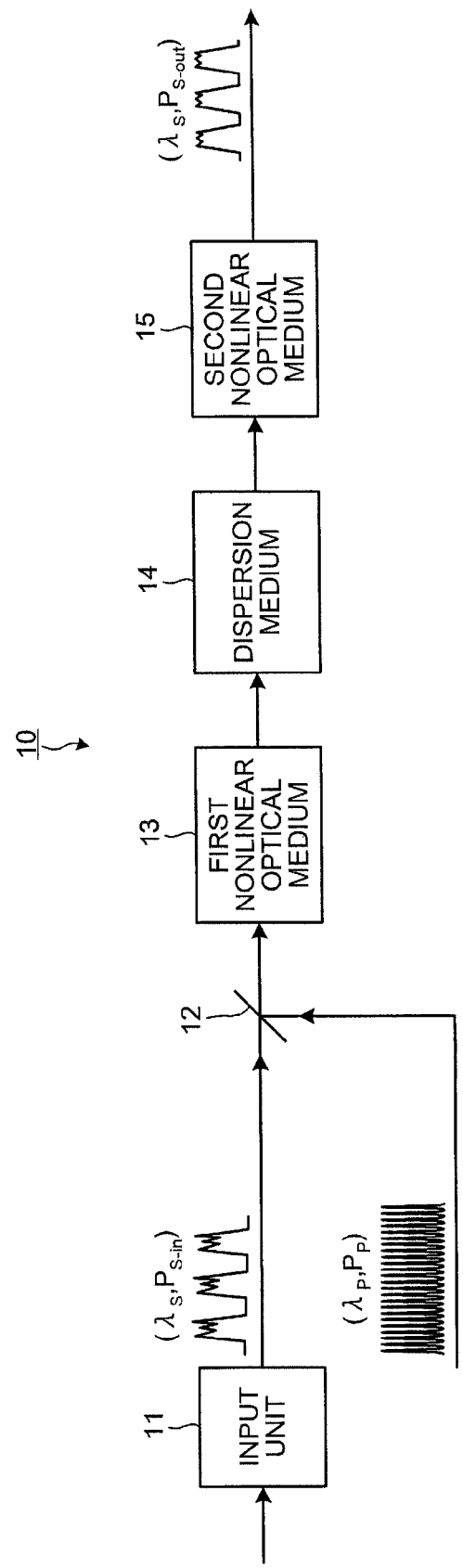
FIG. 1 is a block diagram of a functional configuration of an optical signal processing apparatus according to a first embodiment.

FIG. 1 is a block diagram of a functional configuration of an optical signal processing apparatus according to a first embodiment. As shown in FIG. 1, the optical signal processing apparatus 10 according to the first embodiment includes a signal input unit 11, a wave coupler 12, a first nonlinear optical medium 13, a dispersion medium 14, and a second nonlinear optical medium 15. The optical signal processing apparatus 10 amplifies signal light using a nonlinear optical effect.

The signal input unit 11 is an input unit to which signal light transmitted from another communication apparatus is input. The wavelength of signal light input to the signal input unit 11 is $\lambda_s$. A WDM signal including signal light having different wavelengths is input to the signal input unit 11, which outputs the signal light to the wave coupler 12.

Signal light output from the signal input unit 11 and pulsed pump light having a wavelength different from that of signal light are input to the wave coupler 12, which is a wave coupling unit that couples input signal light and pulsed pump light. The wavelength of the pulsed pump light input to the wave coupler 12 is $\lambda_p$ (not equal to $\lambda_s$). The wave coupler 12 outputs the signal light and the pulsed pump light in a coupled form to the first nonlinear optical medium 13. The power of the signal light output from the wave coupler 12 is $P_{s\text{-}in}$, and the power of the pulsed pump light output from the wave coupler 12 is $P_p$.

The first nonlinear optical medium 13 transmits the signal light and the pulsed pump light output from the wave coupler 12 to the dispersion medium 14. The power of the signal light output from the first nonlinear optical medium 13 is $P_{s\text{-}out}$, and the wavelength of the signal light output from the first nonlinear optical medium 13 is $\lambda_s$, which is the same wavelength of the signal light upon entering the first nonlinear optical medium 13. The first nonlinear optical medium 13 is, for example, an optical fiber, a semiconductor optical amplifier having a quantum well structure, or a semiconductor optical amplifier having a quantum dot structure.

The first nonlinear optical medium 13 may be a medium that causes a second-order nonlinear optical effect such as three-wave mixing. For example, the first nonlinear optical medium 13 may be an $LiNbO_3$ waveguide (periodically poled Lithium Niobate (PPLN)) having a pseudo phase matching structure, a GaAlAs element, or a second-order nonlinear optical crystal. In this case, three-wave mixing occurs according to the pulsed pump light traveling through the first nonlinear optical medium 13.

The dispersion medium 14, which is, for example, a dispersion fiber, transmits the signal light and the pulsed pump light output from the first nonlinear optical medium 13 and outputs the signal light and the pulsed pump light to the second nonlinear optical medium 15. The second nonlinear optical medium 15 transmits and outputs the signal light and the pulsed pump light to an external destination outside the optical signal processing apparatus.

A specific example of the second nonlinear optical medium 15 is identical to that of the first nonlinear optical medium 13 and therefore, description thereof is omitted. A filter that cuts off pulsed pump light may be disposed downstream from the second nonlinear optical medium 15. For example, a filter that cuts off light having the wavelength $\lambda_p$ is disposed downstream from the second nonlinear optical medium 15, thereby enabling extraction of only the signal light from among the signal light and the pulsed pump light having traveled through the second nonlinear optical medium 15.

Figure 2:
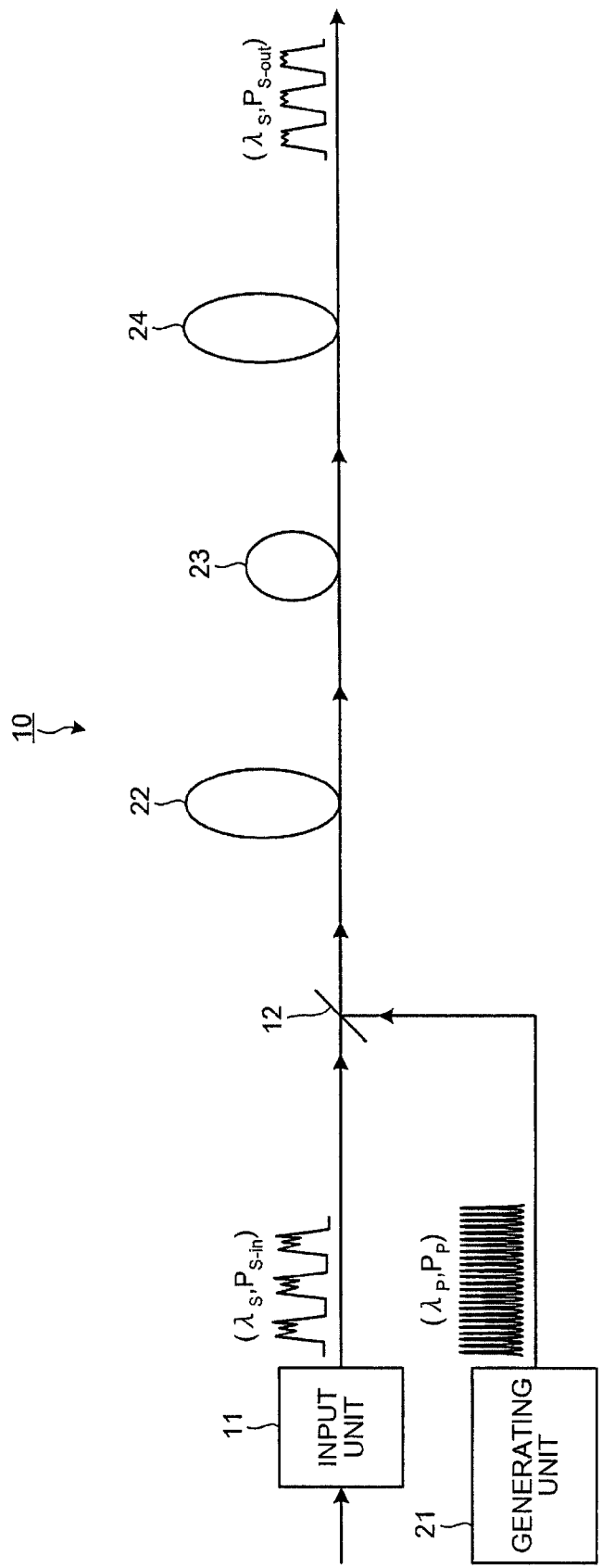
FIG. 2 is a block diagram of a configuration example of the optical signal processing apparatus shown in FIG. 1.

FIG. 2 is a block diagram of a configuration example of the optical signal processing apparatus shown in FIG. 1. In FIG. 2, components identical to those described in FIG. 1 are denoted by identical reference numerals, respectively and description thereof is omitted. As shown in FIG. 2, the optical signal processing apparatus of FIG. 2 further includes a generating unit 21, in addition to the components shown in FIG. 1. In this case, the generating unit 21 and the wave coupler 12 make up a wave coupling unit that couples the input signal light and the pulsed pump light.

The generating unit 21 generates pulsed pump light having the wavelength $\lambda p$, and outputs the pulsed pump light to the wave coupler 12. The generating unit 21 generates pulsed pump light composed of an optical pulse train having a repetitive frequency (pulse frequency) higher than the modulation rate of signal light input to the input unit 11.

The generating unit 21 generates pulsed light having a high repetitive frequency by, for example, time division multiplexing multiple light pulses. For example, light pulse time division multiplexing is carried out by branching pulsed pump light by a branch unit, delaying part of the branched pulsed pump light by a delay circuit, and coupling every branched pulsed pump light by a wave coupler.

The generating unit 21 is, for example, a pulse laser light source. Any conventional pulse generating method is applicable in generating pulsed pump light by the generating unit 21. Pulsed pump light is, for example, a pulse train that is generated by a semiconductor mode-locked laser or fiber mode-locked laser that is oscillated at a desired repetitive frequency.

The generating unit 21, specifically, includes a light source and an intensity modulator, such as a $LiNbO_3$ intensity modulator and an electronic absorption modulator. In this case, pulsed pump light is generated by the intensity modulator that modulates continuous light output from the light source with an electric signal having a desired repetitive frequency.

Pulsed pump light may be an optical comb generated by an optical phase modulator that modulates light with an electric signal having a desired repetitive frequency, or an optical pulse train generated by an optical band pass filter that extracts light in a desired wavelength band from an optical comb. Pulsed pump light may be an optical pulse train made of beating coherent light detuning at a desired repetitive frequency.

Pulsed pump light may be super continuum (SC) light that is generated by, for example, inputting light pulses having a desired repetitive frequency to a nonlinear fiber, or an optical pulse train that is generated by extracting light in a desired wavelength band from SC light through an optical band pass filter. The generating unit 21 generates pulsed pump light that has power high enough to increase the power of signal light in the first and second nonlinear optical media 13 and 15.

In this embodiment, an optical fiber 22 and an optical fiber 24 are used as the first nonlinear optical medium 13 and the second nonlinear optical medium 15, respectively. As the signal light is input together with the pulsed pump light to the optical fibers 22 and 24, four-wave mixing (FWM) corresponding to accompanying pulsed pump light occurs on signal light that passes through the optical fibers 22 and 24.

The optical fibers 22 and 24 are respectively made of the same material, and the generating unit 21 may have a configuration capable of substantially matching the wavelength $\lambda p$ of generated pulsed pump light to the average zero-dispersion wavelength of the optical fibers 22 and 24. Further, the average zero-dispersion wavelength of the optical fibers 22 and 24 may be matched substantially to the wavelength $\lambda p$ of the generated pulsed pump light through temperature control, etc., over the optical fibers 22 and 24. In this manner, phase matching is achieved to efficiently cause optical parametric amplification through four-wave mixing.

A method of causing the dispersion slopes of the optical fibers 22 and 24 to become linear (third-order dispersion) over a wavelength band used in the optical signal processing apparatus 10 is also effective for efficient optical parametric amplification, i.e., the quadratic dispersion of the optical fibers 22 and 24 is reduced to zero (or to a sufficiently small level) over the operating wavelength band. Phase matching may be carried out by setting the wavelength $\lambda p$ of pulsed pump light closer to the long wavelength side than the wavelength $\lambda s$ of the signal light and using nonlinear phase shifting. By these methods, optical parametric amplification through four-wave mixing can be caused more efficiently.

The optical fibers 22 and 24 must each have a sufficient length to cause the nonlinear optical effect. The length of each of the optical fibers 22 and 24 is determined so that the efficiency of occurrence of optical parametric amplification at the optical fiber 22 and at the optical fiber 24 are substantially equal. The length of each of the optical fibers 22 and 24 may be determined so that a limiter effect is optimized.

The optical fibers 22 and 24 may be, for example, a highly nonlinear optical fiber (HNLF), etc., having an enhanced nonlinear optical effect. The HNLF may be an optical fiber that is made by doping the fiber core with a germanium, bismuth-oxide fiber, chalcogenide fiber, etc., to obtain a higher nonlinear refraction factor.

The HNLF may be an optical fiber that is given a higher light power density by designing a smaller (narrower) mode field for the optical fiber, or may be a photonic crystal fiber. With the same configuration of the optical signal processing apparatus, optical Raman amplification may be adopted in place of optical parametric amplification. Whether optical parametric amplification or optical Raman amplification is to be adopted depends on the relation between the wavelength $\lambda p$ of the signal light and the wavelength $\lambda s$ of the pulsed pump light.

The dispersion medium 14 is, for example, a dispersion fiber 23 exhibiting large chromatic dispersion per unit length. For example, when signal light is in a wavelength band of 1.5 μm, the dispersion fiber 23 may be provided as a single mode fiber (SMF) having an average zero-dispersion wavelength of 1.3 μm, a dispersion compensating fiber (DCF), etc.

For instance, a case is assumed where pulsed pump light composed of a pulse train of 100 GHz is shifted in timing relative to the signal light by 5 ps, using a single mode fiber exhibiting chromatic dispersion of +20 ps/nm/km. In this case, if a wavelength difference $\lambda_s - \lambda_p$ between the signal light and the pulsed pump light is assumed to be 50 nm, a single mode fiber of 5 m in length is to be used.

An optical band pass filter may be disposed on the output side of at least one of the first and second nonlinear optical media 13 and 15. This optical band pass filter is, for example, a band pass filter that has a transmission peak near the central wavelengths of the signal light components included in WDM signal light. In the optical signal processing apparatus 10, coupling of the signal light and the pulsed pump light generates a frequency component higher than the frequency of the signal light. This expands the spectrum of the signal light to make it larger than the spectrum at the time of input of signal light.

However, by disposing the optical band pass filter on the output end of at least one of the first and second nonlinear optical media 13 and 15, the high-frequency component generated in the signal light can be equalized. The optical band pass filter may be, for example, an interleaver filter, a combination of fiber gratings, a cyclic filter having an resonator structure, etc. A Fabry-Perot filter may be used as the cyclic filter having the resonator structure.

Figure 3:
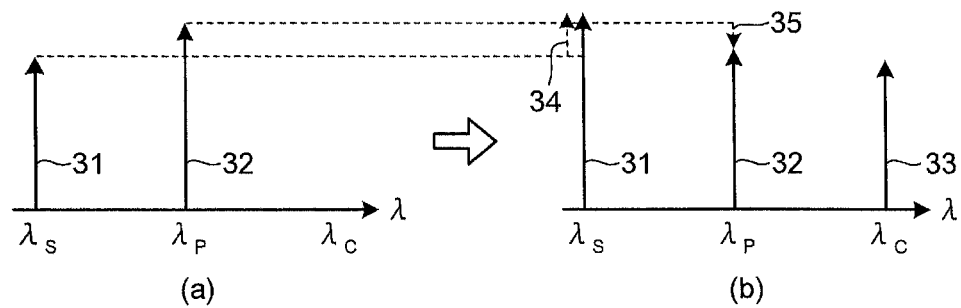
FIG. 3 depicts allocations of the wavelengths of signal light and pulsed pump light.

FIG. 3 depicts positions of the wavelengths of the signal light and the pulsed pump light. Optical parametric amplification at the first nonlinear optical medium 13 is described with reference to FIGS. 3 to 5, and the description applies further to optical parametric amplification at the second nonlinear optical medium 15. In FIG. 3, the horizontal axis represents the wavelengths $\lambda$ ($\lambda_s$, $\lambda_p$) of the signal light and the pulsed pump light, and the vertical axis represents the power Ps of the signal light and the power PP of the pulsed pump light. Section (a) depicts the positions of the wavelengths of the signal light and pump light input to the first nonlinear optical medium 13.

Section (b) depicts the allocations of the wavelengths of the signal light and the pump light output from the first nonlinear optical medium 13. Reference numeral 31 denotes the position of the wavelength of the signal light, and reference numeral 32 denotes the pulsed pump light. Although in FIG. 3, the wavelength $\lambda_s$ of signal light input to the first nonlinear optical medium 13 is depicted to be shorter than the wavelength $\lambda_p$ of pulsed pump light input to the first nonlinear medium 13, the wavelength $\lambda_s$ may be longer than the wavelength $\lambda_p$. The wavelength difference $|\lambda_s-\lambda_p|$ between the signal light and the pulsed pump light is, for example, several nm to several ten nm.

Reference numeral 33 denotes idler light corresponding to the signal light, where the idler light is generated by four-wave mixing that occurs when pulsed pump light is input together with signal light to the first nonlinear medium 13. The idler light is of a wavelength $\lambda_c$ that is determined by a frequency symmetrical to the frequency of signal light with respect to the frequency of pulsed pump light ($\omega_c=2\omega_p-\omega_s$, where $\omega$ is frequency of waves). In four-wave mixing, part of the energy of the pulsed pump light is imparted to the signal light and to the idler light in approximately equal amounts. As a result, the signal light is amplified by optical parametric amplification, as denoted by reference numeral 34.

A gain by optical parametric amplification increases approximately in proportional to the square of the power $P_p$ of the pulsed pump light when the power $P_p$ of the pulsed pump light is sufficiently higher than the power $P_s$ of the signal light (e.g., when the power $P_p$ is 10 times or more the power $P_s$). On the other hand, when the power $P_p$ of the pulsed pump light is not sufficiently higher than the power Ps of the signal light, the consumption of the power $P_p$ of pulsed pump light due to four-wave mixing is greater, which results in a depression that is the attenuation of the power $P_p$ of pulsed pump light, as indicated by reference numeral 35.

Figure 4:
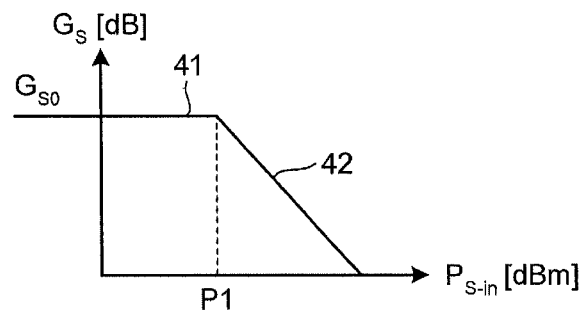
FIG. 4 is a diagram characterizing the relation between input power of the signal light and optical parametric amplification.

FIG. 4 is a diagram characterizing the relation between the input power of the signal light and the optical parametric amplification. In FIG. 4, the horizontal axis represents the input power $P_{s-in}$ (dBm) of the signal light input to the input unit 11, and the vertical axis represents gain $G_s$ (dB) of the signal light by optical parametric amplification at the first nonlinear optical medium 13. The input power $P_p$ of the pulsed pump light input to the wave coupler 12 is assumed to be constant.

When the input power $P_{s-in}$ of signal light is smaller than a given threshold power $P_1$, the gain Gs by optical parametric amplification is constant ($=G_{so}$), as denoted by reference numeral 41. When the input power $P_{s-in}$ of signal light exceeds the threshold power $P_1$, a depression in the pulsed pump light occurs, which leads to a quick saturation of the gain of the signal light by optical parametric amplification. As a result, the gain $G_s$ of the signal light by optical parametric amplification decreases, as denoted by reference numeral 42.

While the input power $P_p$ of pulsed pump light is described as a constant power, the relative power of the signal light and the pulsed pump light is adjusted to actually saturate optical parametric amplification. For example, the generating unit 21 outputs pulsed pump light of a power substantially identical to the power of the signal light input to the input unit 11 to saturate optical parametric amplification.

Figure 5:
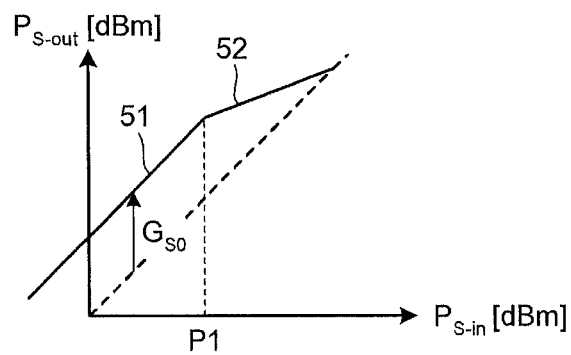
FIG. 5 is a diagram characterizing the relation between the input power and the output power of the signal light.

FIG. 5 is a diagram characterizing the relation between the input power and the output power of the signal light. In FIG. 5, the horizontal axis represents the input power $P_{s-in}$ (dBm) of the signal light input to the signal input unit 11, and the vertical axis represents the output power $P_{s-out}$ (dBm) of the signal light output from the first nonlinear optical medium 13 (or second nonlinear optical medium 15).

A solid line represents the output power $P_{s-out}$ of the signal light output from the nonlinear optical medium 13 after being subjected to optical parametric amplification in the nonlinear optical medium 13. A dotted line represents the output power Ps-out of the signal light that results when the gain $G_s$ by optical parametric amplification at the nonlinear optical medium 13 is zero. In this case, the input power of the pulsed pump light is assumed to be constant.

The output power $P_{s-out}$ of the signal light increases with an increase in the input power $P_{s-in}$ of the signal light. When the input power Ps-in of the signal light is less than the given threshold power $P_1$, the output power $P_{s-out}$ of signal light (solid line) increases by the gain $G_{so}$ as a result of optical parametric amplification, as indicated by reference numeral 51.

When the input power $P_{s-in}$ of the signal light exceeds the threshold power $P_1$, the gain $G_s$ by optical parametric amplification decreases (see FIG. 4) in the output power $P_{s-out}$ of the signal light (continuous line), which thus approaches the output power $P_{s-out}$ in the case of zero gain $G_s$ by optical parametric amplification (dotted line), as denoted by reference numeral 52.

As a result, even when the input power $P_{s-in}$ increases, the power $P_{s-out}$ does not further increase beyond a certain value. Hence the optical signal processing apparatus 10 operates as an optical amplifier providing a linear gain when the input power $P_{s-in}$ of the signal light is equal to or less than the threshold power $P_1$, while operating as an optical limiter amplifier that suppresses intensity fluctuations of the output power $P_{s-out}$ when the input power $P_{s-in}$ of the signal light is greater than the threshold power $P_1$.

To suppress intensity fluctuations of the signal light at zero gain level, a saturable absorbing unit may be disposed upstream or downstream from at least one of the first and second nonlinear optical media 13 and 15. The saturable absorbing unit is, for example, a semiconductor saturable absorber, semiconductor amplifier, Mach-Zehnder interferometer optical fiber switch, nonlinear optical loop mirror (NOLM) switch, etc.

Figure 6:
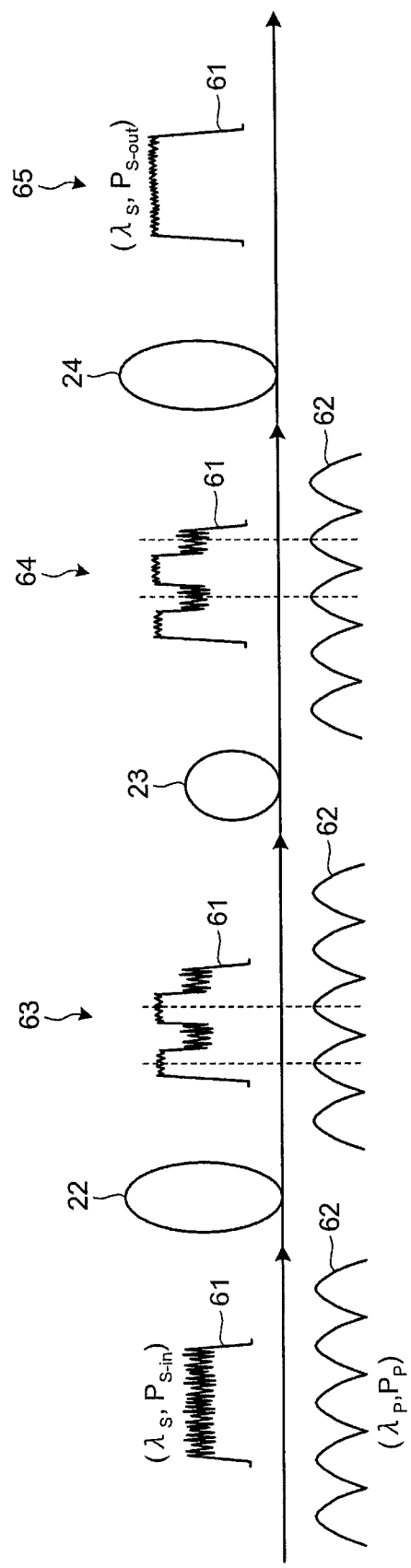
FIG. 6 depicts a timing shift of the signal light and the pulsed pump light.

FIG. 6 depicts a timing shift of the signal light and the pulsed pump light. In FIG. 6, reference numerals 61 and 62 denote the waveform of the signal light and that of the pulsed pump light, respectively. When the signal light and the pump light coupled by the wave coupler 12 are input to the optical fiber 22, only the portions of signal light that coincide with the peak portions of pulsed pump light are amplified, as indicated by reference numeral 63.

When the signal light and the pulsed pump light output from the optical fiber 22 travel through the dispersion fiber 23, the relative timing of the signal light and the pulsed pump light shifts. When the signal light and the pulsed pump light output from the dispersion fiber 23 are input to the optical fiber 24, only the portions of signal light that coincide with the peak portions of the pulsed pump light are amplified.

At this time, because the relative timing of the signal light and the pulsed pump light in the optical fiber 22 is different from the relative timing of the signal light and the pulsed pump light in the optical fiber 24, as indicated by reference numeral 64, portions of the signal light different from the portions of the signal light amplified through the optical fiber 22 are amplified in the optical fiber 24. As a result, as indicated by reference numeral 65, the signal light is output from the optical fiber 24 as signal light that is uniformly amplified based on the timing the peak portion of the pulsed pump light and imparted with a temporally uniform gain.

The length of the dispersion fiber 23 is determined so that the extent of the shift of the relative timing of the signal light and the pulsed pump light is approximately half of the pulse interval of pulsed pump light. For example, when the pulsed pump light is a pulse train of approximately 100 GHz, the length of the dispersion fiber 23 is determined so that the extent of the shift of the relative timing of each pump light pulse is approximately 5 ps.

Through this configuration, the relative timing of the signal light and the pulsed pump light is shifted by a half period of the pulsed pump light in the optical fiber 22 and in the optical fiber 24. As a result, portions of the signal light different from the portions amplified through the optical fiber 22 are primarily amplified in the optical fiber 24.

This case is equivalent to a case where pulsed pump light having a repetitive frequency twice the frequency of this case is input to an optical fiber in a conventional configuration, which does not include the dispersion fiber 23 and the optical fiber 24. In other words, according to the optical signal processing apparatus 10 of the first embodiment, the repetitive frequency of the pulsed pump light necessary for uniform amplification of the signal light can be reduced to half of the frequency required conventionally.

Figure 7:
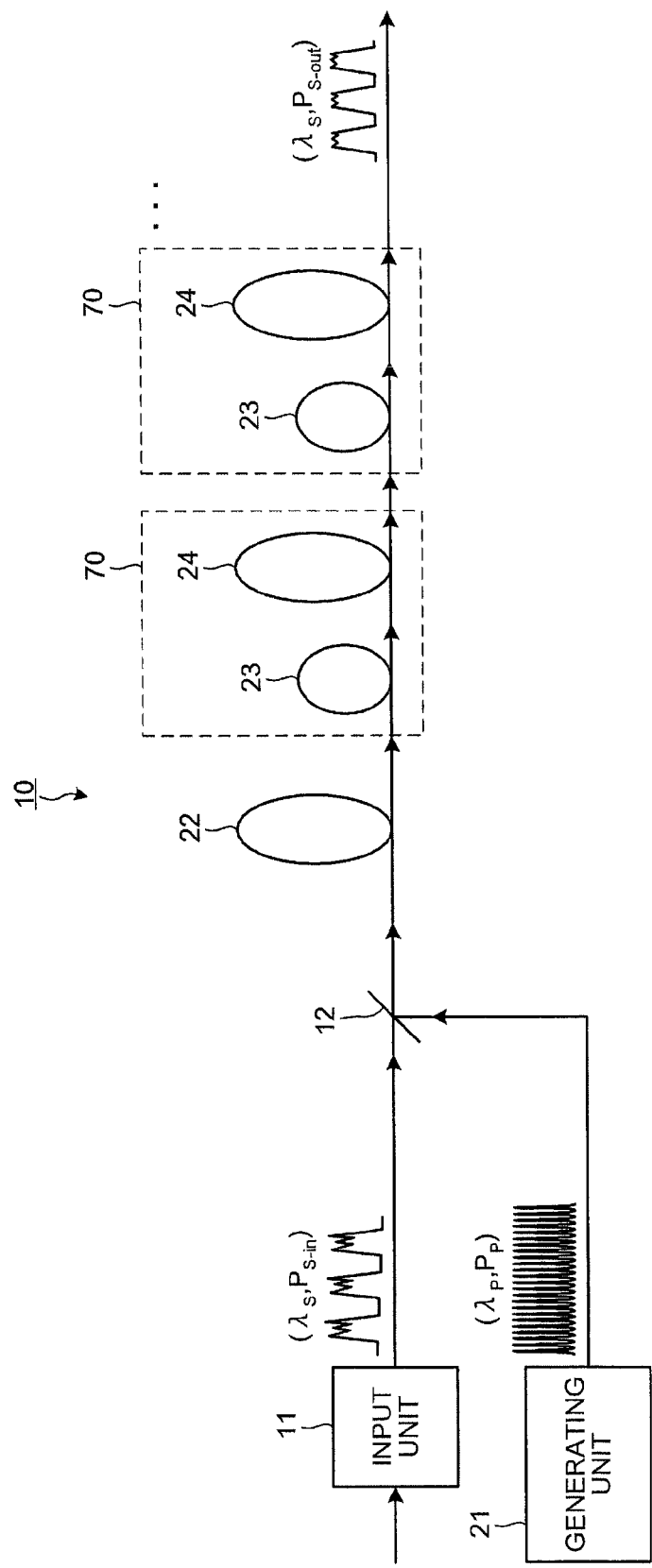
FIG. 7 is a block diagram of a modification of the optical signal processing apparatus shown in FIG. 2.

FIG. 7 is a block diagram of a modification of the optical signal processing apparatus shown in FIG. 2. In FIG. 7, component identical to those described in FIG. 2 are denoted by identical reference numerals, respectively and description thereof is omitted. As shown in FIG. 7, plural combinations 70 of the dispersion fibers 23 and the optical fibers 24 may be disposed downstream from the optical fiber 22 of the optical signal processing apparatus shown in FIG. 2.

With this configuration, the relative timing of the signal light and the pulsed pump light is shifted several times through the plural dispersion fibers 23 to cause the optical fibers 24 to amplify signal light at every timing shift. As a result, the signal light output from the optical fiber 24 farthest downstream is given a gain that is further temporally uniform.

If the number of the combinations 70 disposed downstream from the optical fiber 22 is N (N=2, 3, . . . ), the relative timing of the signal light and the pulsed pump light shift N times. Here, the length of each of the dispersion fibers 23 is determined so that the extent of the shift of the relative timing of the signal light and the pulsed pump light is approximately 1/(N+1) of the pulse interval of the pulsed pump light.

For example, when two combinations 70 of the dispersion fibers 23 and the optical fibers 24 are disposed downstream from the optical fiber 22, N equals 2. In this case, the length of each of the dispersion fibers 23 is determined so that the extent of the shift of the relative timing of the signal light and the pulsed pump light is approximately ⅓ of the pulse interval of the pulsed pump light.

Figure 8:
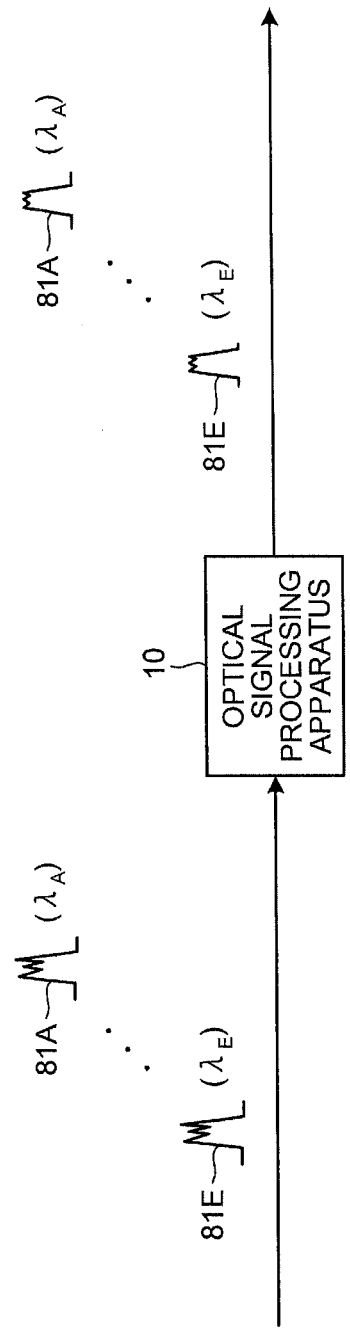
FIG. 8 depicts waveform reshaping of a WDM signal by the optical signal processing apparatus.

FIG. 8 depicts waveform reshaping of a WDM signal by the optical signal processing apparatus. In FIG. 8, reference numerals 81A to 81E denote signal light components (wavelengths $\lambda_A$ to $\lambda_E$) included in a WDM signal input to the optical signal processing apparatus 10. As shown in FIG. 8, each of signal light components included in the WDM signal input to the optical signal processing apparatus 10 arrives in random timing.

The optical signal processing apparatus 10 shifts the relative timing of each of the signal light components and the pulsed pump light through the dispersion medium 14 or the dispersion fiber 23 to enable uniform amplification of each of the signal light components regardless of the timing of arrival of each of the signal light components. This enables uniform waveform reshaping of each of the signal light components without providing plural pump light generating circuits, clock recovery circuits, etc., respectively corresponding to each channel.

According to the optical signal processing apparatus 10 of the first embodiment, signal light and pulsed pump light having wavelengths different from each other are transmitted through the dispersion medium 14 to shift the relative timing of the signal light and the pulsed pump light, thereby causing the timing of the pulsed pump light for the signal light in the first nonlinear optical medium 13 different from that for the signal light in the second nonlinear optical medium 15. As a result, the signal light is imparted with a gain uniform in time sequence amplified uniformly.

As the optical signal processing apparatus 10 is capable of uniformly amplifying signal light merely by a configuration including the dispersion medium 14 and the second nonlinear optical medium 15, the optical signal processing apparatus 10 has a simple configuration. For example, the optical signal processing apparatus 10 enables substantial size and cost reduction compared with an apparatus where pulsed pump light is time division multiplexed through a branch unit, delay circuit, wave coupler, etc., to increase the repetitive frequency of pulsed pump light. If time division multiplexing of signal light processing is also adopted in the optical signal processing apparatus 10, more uniform amplification of signal light is possible.

In the first embodiment, description is made of a configuration where the generating unit 21 generates pulsed pump light composed of an optical pulse train having a repetitive frequency higher than the modulation rate of the signal light input to the input unit 11. The configuration of the optical signal processing apparatus 10, however, is not limited hereto. Generally, the signal light is amplified more uniformly as the repetitive frequency of the pulsed pump light increases. In addition, the optical signal processing apparatus 10 is capable of improving the efficiency of uniform amplification of the signal light in relation to the repetitive frequency of the pulsed pump light.

In the first embodiment, description is made a configuration where the length of each of the dispersion fibers 23 is determined so that the extent of the shift of the relative timing of the signal light and the pulsed pump light is approximately 1/(N+1) of the pulse interval of the pulsed pump light. The configuration of the optical signal processing apparatus 10, however, is not limited hereto. Uniform amplification of signal light is achieved when the length of each of the dispersion fibers 23 is determined so that the extent of the shift of the relative timing of the signal light and the pulsed pump light does not coincide with the pulse interval of the pulsed pump light.

Figure 9:
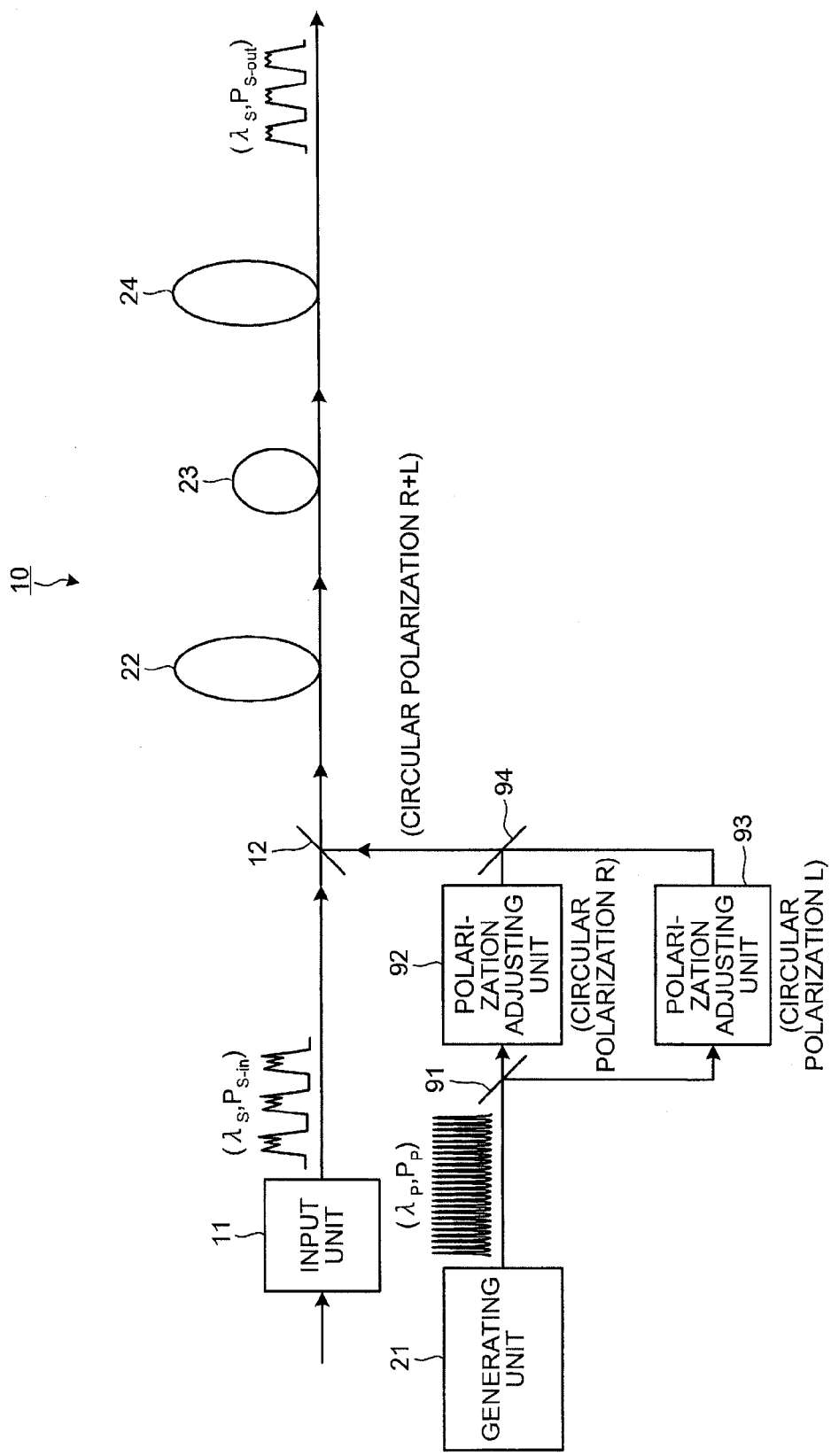
FIG. 9 is a block diagram of a functional configuration of an optical signal processing apparatus according to a second embodiment.

FIG. 9 is a block diagram of a functional configuration of an optical signal processing apparatus according to a second embodiment. In FIG. 9, component units identical to those described in FIG. 2 are denoted by identical reference numerals, respectively and description thereof is omitted. As shown in FIG. 9, the optical signal processing apparatus 10 according to the second embodiment includes a branch unit 91, a polarization adjusting units 92, 93, and a wave coupler 94, in addition to the components of the optical signal processing apparatus 10 shown in FIG. 2.

The branch unit 91, polarization adjusting units 92, 93, and wave coupler 94 make up a polarization adjusting unit that converts pulsed pump light output from the generating unit 21 to pulsed pump light composed of two circular polarization components having polarization states orthogonal to each other. The branch unit 91 branches the pulsed pump light output from the generating unit 21, and respectively outputs the branched pump light to the polarization adjusting units 92, 93.

The polarization adjusting unit 92 adjusts the polarization state of the pulsed pump light output from the branch unit 91 to be circularly polarized in a clockwise direction (circular polarization R). The polarization adjusting unit 92 outputs the pulsed pump light in the adjusted polarization state to the wave coupler 94. The polarization adjusting unit 93 adjusts the polarization state of pulsed pump light output from the branch unit 91 to be circularly polarized in a counterclockwise direction (circular polarization L). The polarization adjusting unit 93 outputs the pulsed pump light in the adjusted polarization state to the wave coupler 94.

The wave coupler 94 couples the pulsed pump light respectively output from the polarization adjusting units 92, 93 and outputs the coupled pulsed pump light to the wave coupler 12. The pulsed pump light output from the wave coupler 94 to the wave coupler 12 is, thereby, pulsed pump light composed of two circular polarization components having polarization states orthogonal to each other (circular polarization R+L). The power of each of the circular polarization components included in the pulsed pump light output to the wave coupler 12 is determined to be substantially identical.

For example, determining a branch ratio at the branch unit 91 to be 1:1 makes the power of each of the circular polarization components identical. The wave coupler 12 couples the signal light output from the signal light output unit 11 and the pulsed pump light output from the wave coupler 94. As a result, the signal light is amplified with a constant efficiency by parametric amplification in the optical fibers 22 and 24, regardless of the polarization state of the signal light input to the signal light output unit 11.

Figure 10:
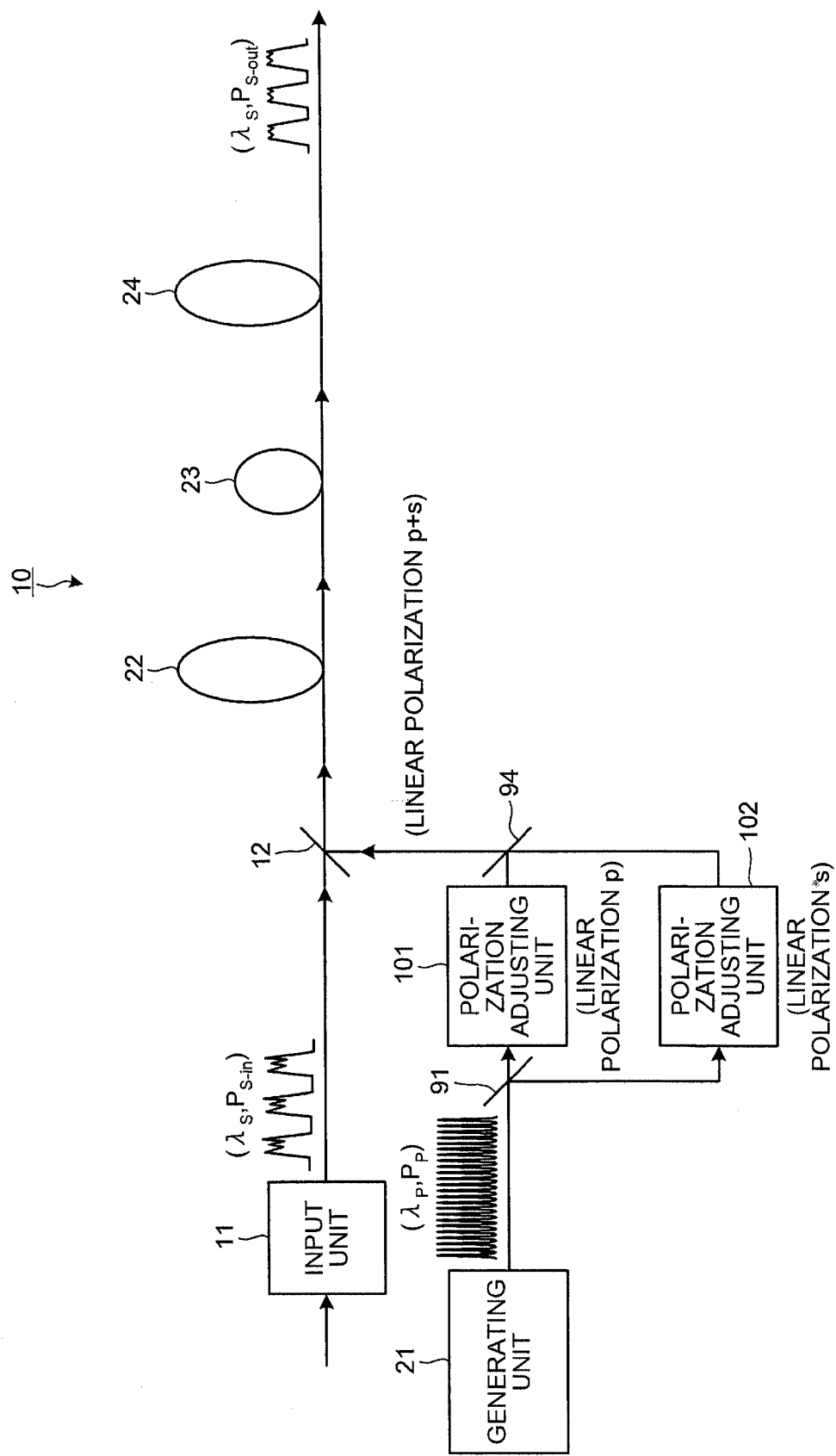
FIG. 10 is a block diagram of a modification of the optical signal processing apparatus shown in FIG. 9.

FIG. 10 is a block diagram of a modification of the optical signal processing apparatus shown in FIG. 9. In FIG. 10, components identical to those described in FIG. 9 are denoted by identical reference numerals, respectively and description thereof is omitted. As shown in FIG. 10, the optical signal processing apparatus 10 according to the second embodiment may include polarization adjusting units 101, 102 in place of the polarization adjusting units 92, 93 of the optical signal processing apparatus 10 shown in FIG. 9.

The branch unit 91, the polarization adjusting unit 101, the polarization adjusting unit 102, and the wave coupler 94 make up a polarization adjusting unit that converts the pulsed pump light output from the generating unit 21 to pulsed pump light composed of two linear polarization components orthogonal to each other. The branch unit 91 respectively outputs the branched pulsed pump light to the polarization adjusting units 101, 102. The polarization adjusting unit 101 adjusts the polarization state of pulsed pump light output from the branch unit 91 to be linearly polarized (linear polarization p). The polarization adjusting unit 101 outputs the pulsed pump light in the adjusted polarization state to the wave coupler 94.

The polarization adjusting unit 102 adjusts the polarization state of the pulsed pump light output from the branch unit 91 to be linearly polarized (linear polarization s) orthogonal to the polarization direction of the pulsed pump light output from the polarization adjusting unit 101. The polarization adjusting unit 102 outputs the pulsed pump light in the adjusted polarization state to the wave coupler 94, which couples the pulsed pump light output respectively from the polarization adjusting units 101, 102.

Pulsed pump light output from the wave coupler 94 to the wave coupler 12 is, thereby, pulsed pump light that is composed of two linear polarization components orthogonal to each other (linear polarization p+s). The power of each of the linear polarization components included in the pulsed pump light output to the wave coupler 12 is determined to be substantially identical. As a result, the signal light is amplified with a constant efficiency by parametric amplification in the optical fibers 22 and 24, regardless of the polarization state of the signal light input to the signal light output unit 11.

In this manner, the optical signal processing apparatus 10 according to the second embodiment achieves the same effect as that of the optical signal processing apparatus 10 according to the first embodiment. In addition, the optical signal processing apparatus 10 according to the second embodiment converts pulsed pump light output from the generating unit 21 to pulsed pump light composed of two circular polarization components having polarization states orthogonal to each other, or composed of two linear polarization components orthogonal to each other, and thus is capable of uniformly amplifying the signal light regardless of the polarization state of the signal light input to the signal input unit 11.

While description is made of a configuration in which pulsed pump light output from the generating unit 21 is branched by the branch unit 91 and the polarization state of each branched pulsed pump light is adjusted, another configuration may be adopted in which an additional generating unit is provided and the polarization states of the pulsed pump light respectively output from the additional generating unit and the generating unit 21 are adjusted. In this case, the wavelength of the pulsed pump light respectively output from the additional generating unit and the generating unit 21 is determined to be within a wavelength band where pulsed pump light is capable of achieving a desired pump effect.

Figure 11:
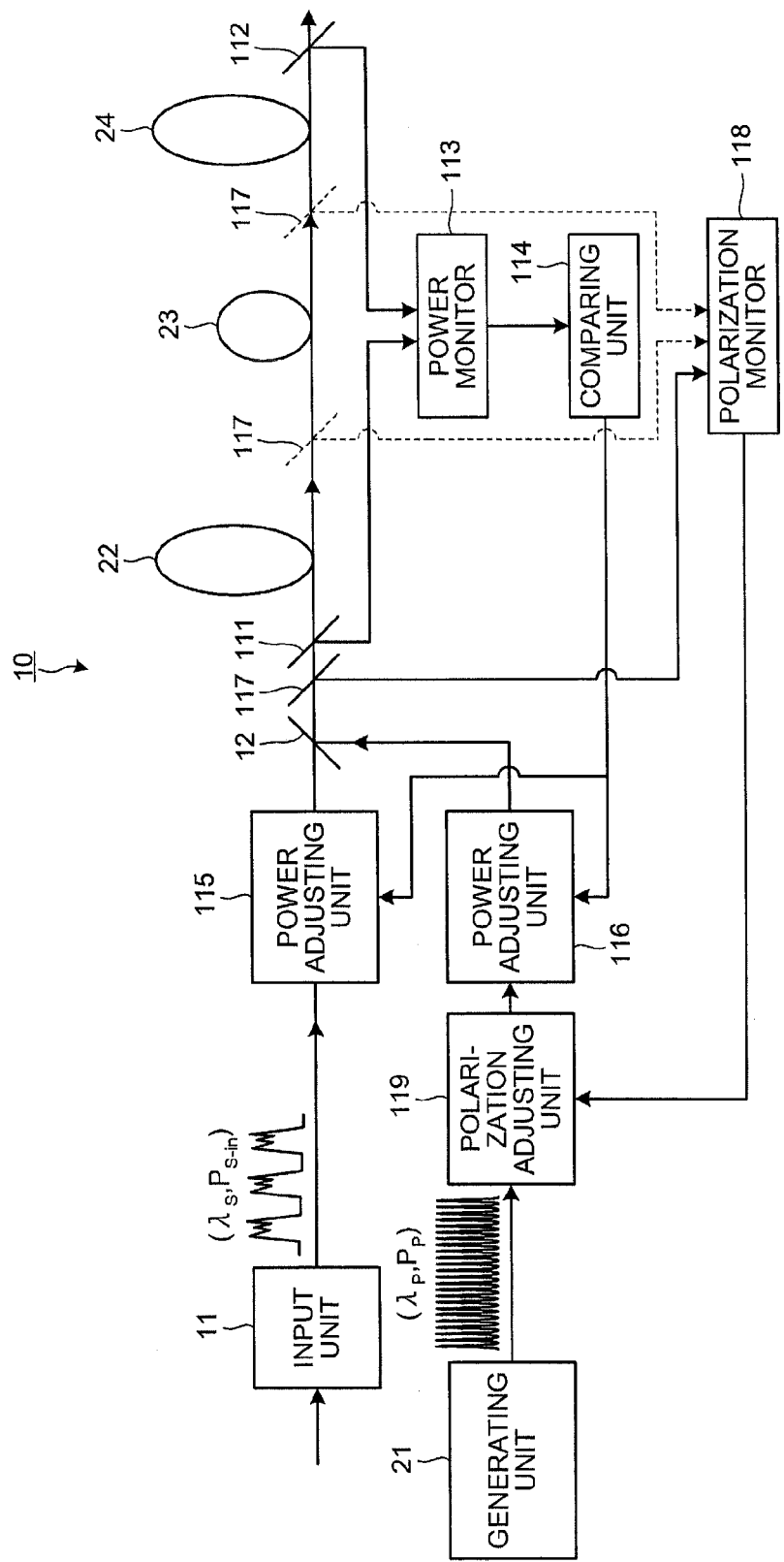
FIG. 11 is a block diagram of a functional configuration of an optical signal processing apparatus according to a third embodiment.

FIG. 11 is a block diagram of a functional configuration of an optical signal processing apparatus according to a third embodiment. In FIG. 11, components identical to those described in FIG. 2 are denoted by identical reference numerals, respectively and description thereof is omitted. As shown in FIG. 11, the optical signal processing apparatus 10 according to the third embodiment includes branch units 111, 112, a power monitor 113, a comparing unit 114, power adjusting units 115, 116, a branch unit 117, a polarization monitor 118, and a polarization adjusting unit 119, in addition to the components of the optical signal processing apparatus 10 shown in FIG. 2.

The branch units 111, 112, and power monitor 113 make up a power monitoring unit that monitors the power of light input to the optical fiber 22 and the power of light transmitted through the optical fiber 24. Specifically, the branch unit 111 branches part of the light output from the wave coupler 12 to the optical fiber 22 and outputs the branched light to the power monitor 113. The branch unit 112 branches part of the light output from the optical fiber 24 to an external destination and outputs the branched light to the power monitor 113.

The power monitor 113 monitors the power of the light output from the branch unit 111 and outputs to the comparing unit 114, an electric signal according to the monitored power as information indicating the power of signal light before amplification thereof. The power monitor 113 monitors the power of light output from the branch unit 112 and outputs to the comparing unit 114, an electric signal according to the monitored power as information indicating the power of signal light after amplification thereof.

The comparing unit 114 and the power adjusting units 115, 116 make up a power control unit that controls the power of the signal light and the pulsed pump light coupled by the wave coupler 12, based on a monitoring result obtained by the branch units 111, 112, and power monitor 113. Specifically, the comparing unit 114 compares information indicating the power of signal light before amplification thereof with information indicating the power of signal light after amplification thereof, the information being output from the power monitor 113, and calculates gain of the signal light.

The comparing unit 114 outputs information indicating the calculated gain to the power adjusting units 115, 116. Based on the gain information output from the comparing unit 114, the power adjusting unit 115 adjusts the power of the signal light that is output from the input unit 11 to wave coupler 12. Based on the gain information output from the comparing unit 114, the power adjusting unit 116 adjusts the power of the pulsed pump light that is output from the generating unit 21 to the wave coupler 12.

The power adjusting units 115, 116 adjust the relative power of the signal light and the pulsed pump light input to the wave coupler 12 such that the gain indicated by information output from the comparing unit 114 is equivalent to a desired gain. For example, the power adjusting units 115, 116 adjust the relative power of the signal light and the pulsed pump light so that a gain of the signal light is saturated, thus causing the optical signal processing apparatus 10 to operate as an optical limiter amplifier.

The branch unit 117 and the polarization monitor 118 make up a polarization monitoring unit that monitors the polarization state of the pulsed pump light input to the optical fiber 22 or to the optical fiber 24. Specifically, the branch unit 117 branches part of the pulsed pump light included in the light output from the wave coupler 12 to the optical fiber 22 and outputs the branched light to the polarization monitor 118. The branch unit 117 is, for example, a photocoupler that separates only the light component having a wavelength of $\lambda p$ from the pulsed pump light.

The polarization monitor 118 monitors the polarization state of the pulsed pump light output from the branch unit 117. The polarization monitor 118, for example, detects stokes parameters of the pulsed pump light output from the branch unit 117 as information indicative of the polarization state of the pulsed pump light. The polarization monitor 118 outputs to the polarization adjusting unit 119, information indicating the monitored polarization state.

The polarization adjusting unit 119 makes up a polarization control unit that controls, based on a monitoring result from the polarization monitoring unit, the polarization state of the pulsed pump light coupled by the wave coupler 12. Specifically, the polarization adjusting unit 119 adjusts the polarization state of the pulsed pump light output from the generating unit 21 to the wave coupler 12 so that the efficiency of the occurrence of the nonlinear optical effect, such as four-wave mixing occurring in the optical fibers 22 and 24, is optimized.

For example, the polarization adjusting unit 119 adjusts the polarization state of the pulsed pump light so that the difference between stokes parameters output from the polarization monitor 118 and preset target stokes parameters becomes small. While description is made of a configuration in which the branch unit 117 is disposed between the wave coupler 12 and the optical fiber 22 to branch the light output from the wave coupler 12 to the optical fiber 22, the branch unit 117 may be disposed between the optical fiber 22 and the dispersion fiber 23 or between the dispersion fiber 23 and the optical fiber 24, as indicated by a dotted line in FIG. 11.

Figure 12:
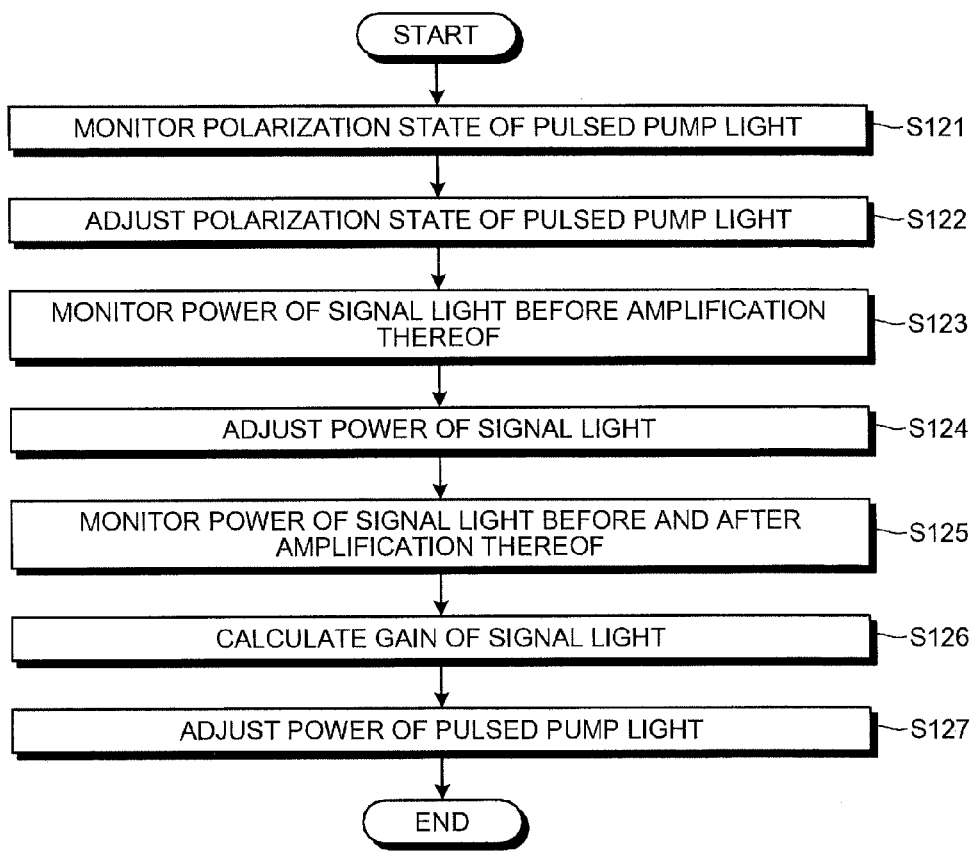
FIG. 12 is a flowchart of an example of control performed by the optical signal processing apparatus shown in FIG. 11.

FIG. 12 is a flowchart of an example of control performed by the optical signal processing apparatus shown in FIG. 11. The optical signal processing apparatus shown in FIG. 11 includes a control unit composed of a central processing unit (CPU), etc., and controls the components shown in FIG. 11 to perform the following process. As shown in FIG. 12, the polarization monitor 118 monitors the polarization state of the pulsed pump light input to the optical fiber 22, based on the pulsed pump light output from the branch unit 117 (step S121).

Based on the polarization state monitored at step S121, the polarization adjusting unit 119 adjusts the polarization state of the pulsed pump light output from the generating unit 21 to the wave coupler 12 to a desired polarization state (step S122). The power monitor 113 monitors, based on light output from the branch unit 111, the power of the signal light before amplification thereof through the optical fibers 22 and 24 (step S123).

Based on the power monitored at step S123, the power adjusting unit 115 adjusts the power of the signal light output from the input unit 11 to the wave coupler 12 (step S124). Then, based on the light output from the branch units 111 and 112, the power monitor 113 monitors the power of each signal light before and after amplification thereof through the optical fibers 22 and 24 (step S125).

Based on each power monitored at step S125, the comparing unit 114 calculates a gain of the signal light (step S126). Based on the gain calculated at step S126, the power adjusting unit 116 then adjusts the power of the pulsed pump light output from the generating unit 21 (step S127), and a series of the control process ends.

In this manner, the optical signal processing apparatus 10 according to the third embodiment offers the same effect as that according to the first embodiment. In addition, the optical signal processing apparatus 10 according to the third embodiment monitors the power of the light input to the optical fiber 22 and the power of light transmitted through the optical fiber 22, and based on a monitoring result, controls the power of the signal light and that of the pulsed pump light, both lights being coupled by the wave coupler 12, and is thus capable of precisely controlling gain imparted to the signal light in the optical fibers 22 and 24.

The optical signal processing apparatus 10 according to the third embodiment further monitors the polarization state of the pulsed pump light input to the optical fiber 22 or to the optical fiber 24, and based on a monitoring result, controls the polarization state of the pulsed pump light coupled by the wave coupler 12 and is thus capable of precisely optimizing the efficiency of the occurrence of the nonlinear optical effect in the optical fibers 22 and 24.

Although description is made of a configuration in which the power of the signal light before and after amplification thereof through the optical fibers 22 and 24 is monitored, another configuration may be adopted in which the quality of the signal light output from the optical fiber 24 is monitored and the power of the signal light and the pulsed pump light or the polarization state of the pulsed pump light is controlled to optimize the monitored quality. The quality of signal light means various parameters, such as an optical S/N ratio, Q value, and bit error rate.

Figure 13:
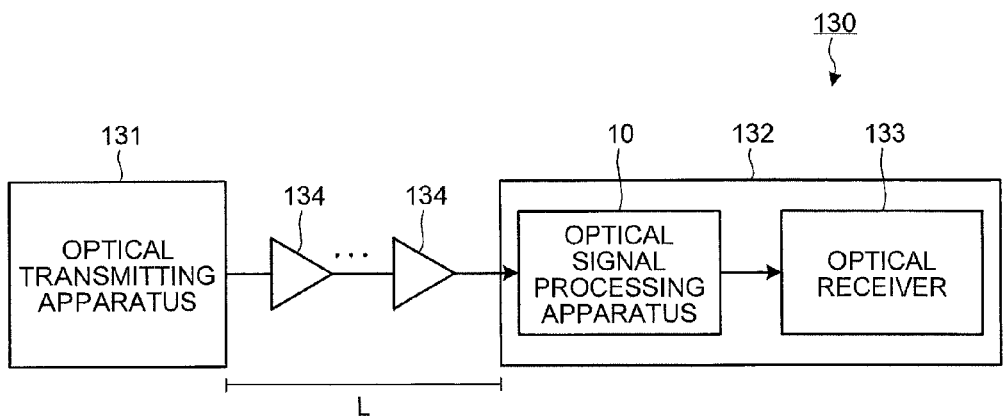
FIG. 13 is a block diagram of an example of an optical communication system according to a fourth embodiment.

FIG. 13 is a block diagram of an example of an optical communication system according to a fourth embodiment. As shown in FIG. 13, an optical communication system 130 according to the fourth embodiment includes an optical transmitting apparatus 131 and an optical receiving apparatus 132. The optical transmitting apparatus 131 transmits to the optical receiving apparatus 132 via a transmission path, signal light modulated by intensity modulation, optical phase modulation, or optical frequency modulation. On the transmission path, optical amplifiers-repeated transmission is carried out using an optical amplifier 134 when necessary.

The optical transmitting apparatus 131 may be configured to transmit a WDM signal as signal light. The optical receiving apparatus 132 includes the optical signal processing apparatus 10 and an optical receiver 133. The optical signal processing apparatus 10 reshapes the waveform of signal light transmitted from the optical transmitting apparatus 131 and outputs the signal light reshaped in waveform to the optical receiver 133. The optical receiver 133 is a receiving unit that receives the signal light transmitted through the optical fiber 24 of the optical signal processing apparatus 10.

Figure 14:
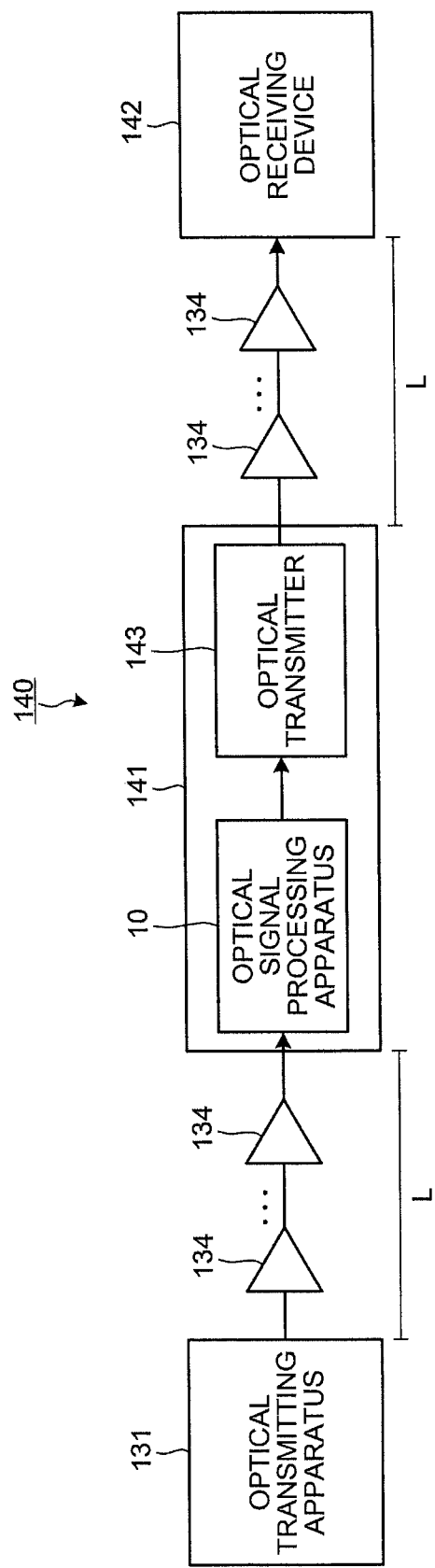
FIG. 14 is a block diagram of another example of the optical communication system according to the fourth embodiment.

FIG. 14 is a block diagram of another example of the optical communication system according to the fourth embodiment. In FIG. 14, components identical to those described in FIG. 13 are denoted by identical reference numerals, respectively and description thereof is omitted. As shown in FIG. 14, an optical communication system 140, which is another example of the optical communication system according to the fourth embodiment, includes the optical transmitting apparatus 131, an optical relay apparatus 141, and an optical receiving apparatus 142. The optical transmitting apparatus 131 transmits signal light to the optical relay apparatus 141 via a transmission path.

The optical relay apparatus 141 is a relay apparatus that relays the signal light transmitted from the optical transmitting apparatus 131 to the optical receiving apparatus 142. The optical relay apparatus 141 includes the optical signal processing apparatus 10 and an optical transmitter 143. The optical signal processing apparatus 10 reshapes the waveform of the signal light transmitted from the optical transmitting apparatus 131 and outputs the signal light reshaped in waveform to the optical transmitter 143.

The optical transmitter 143 is a transmitting unit that transmits the signal light output from the optical fiber 24 of the optical signal processing apparatus 10, to the optical receiving apparatus 142, which receives the signal light transmitted from the optical relay apparatus 141. The optical receiving apparatus 142 may include the optical signal processing apparatus 10 and an optical receiver 133 in a configuration similar to that of the optical receiving apparatus 132 shown in FIG. 13. The optical signal processing apparatus 10 described in the first to third embodiments can be applied as the optical signal processing apparatus 10 shown in FIGS. 13 and 14.

According to the optical communication system of the fourth embodiment, the optical signal processing apparatus 10 according to the embodiments above can be applied to the optical receiving apparatus 132 or to the optical relay apparatus 141. The optical signal processing apparatus 10 achieves the effects described in the embodiments above and by being operated, for example, as a limiter amplifier, enables highly precise waveform reshaping. As a result, a reduction in the number of optical amplifiers 134 among communication apparatuses is enabled. In addition, the optical communication system enables suppression of ASE noises generated by the optical amplifiers 134 and as a result, the number of the optical amplifiers may be increased to extend the distance L between the communication apparatuses.

As described above, according to the optical signal processing apparatus, the optical receiving apparatus, and the optical relay apparatus of the present embodiments, signal light can be amplified uniformly using a simple configuration. Because the phase of signal light is not affected in the amplification processes by the optical signal processing apparatus 10, the waveform reshaping method is applicable to signal light modulated by intensity modulation, optical phase modulation, optical frequency modulation, etc. For phase-modulated signal light, phase noises themselves are not suppressed; rather the optical signal processing apparatus 10 is operated as an optical limiter amplifier to reduce intensity fluctuations, thereby reducing phase noises caused by intensity fluctuations.

In optical fiber transmission, particularly, intensity noise is converted into phase noise (amplitude modulation/phase modulation (AM/PM) conversion) due to a nonlinear optical effect occurring in an optical fiber, and these AM/PM conversion noise is one of the factors that determine a transmission limit of phase-modulated signal light. Utilization of the optical signal processing apparatus 10 enables suppression of the AM/PM conversion noise.

While description is made in the embodiments of a configuration in which a WDM signal is input to the input unit 11, the configuration of the optical signal processing apparatus 10 is not limited hereto and may be a configuration in which signal light not multiplexed in wavelength is input to the input unit 11. In such a configuration, timing of the signal light and that of light pulses may further be matched, so that the signal light is amplified uniformly without provision of a clock recovery circuit, etc.

When signal light is amplified by optical parametric amplification in the optical fibers 22 and 24, which are nonlinear optical media, the signal light may be subjected to the effect of cross phase modulation (XMP) whose intensity is proportional to the power of the pulsed pump light. If the signal light as a whole is subjected to XMP of the same intensity, it constitutes no problem. However, with the optical signal processing apparatus 10 where the signal light is excited by pulses with short time intervals, XPM is intense near the peak and is weak at leading edge and trailing edge of the pulses.

Further, at a portion where the slope of the nonlinear optical effect is steep, chirping proportional to the slope may occur. Even in such a case, according to the optical signal processing apparatus 10, the effect of XPM is imparted uniformly to the signal light overall to disperse the effect of XPM by shifting the relative timing of the signal light and the pulsed pump light.

Specifically, the pulse shape and the pulse interval of pulsed pump light are adjusted so that leading edge and trailing edge of pulsed pump light substantially overlap one another in each nonlinear optical medium, thereby substantially matching the fluctuating value of XPM to the value of XPM near the peak and offsetting chirping occurring with respect to the signal light in the first and second nonlinear optical media 13 and 15. As a result, an efficient optical limiter amplifier compensating the effect of XPM is achieved.

While description is made in the embodiments of a configuration in which pulsed pump light is used as pump light input to the wave coupler 12, the optical signal processing apparatus 10 is applicable in a configuration other than such a configuration. For example, when the signal light is in the form of a WDM signal and continuous light is used as pump light input to the wave coupler 12, the relative timing of each of signal light component included in the WDM signal can be shifted in the first and second nonlinear optical media 13 and 15, thereby equalizing gain in each of the signal light components in the first and second nonlinear optical media 13 and 15.

While description is made in the embodiments of a configuration in which the dispersion medium 14 is disposed between the first nonlinear optical medium 13 and the second nonlinear optical medium 15, another configuration may be adopted, in which the dispersion medium 14 is not provided, rather the pulsed pump light is branched in advance according to power and into two portions, where one portion is input to the first nonlinear optical medium 13 while the other portion is temporally adjusted and then input to the second nonlinear optical medium 15.

As a result, the timing of the pulsed pump light in the first nonlinear optical medium 13 becomes different from that in the second nonlinear optical medium 15, thereby enabling uniform amplification of the signal light.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical signal processing apparatus comprising:
an input unit to which signal light is input;
a wave coupling unit that couples the signal light from the input unit and pump light having a wavelength different from that of the signal light;
a first nonlinear optical medium that transmits light coupled by the wave coupling unit, the light being the signal light and the pump light;
a dispersion medium that transmits the light that has been transmitted through the first nonlinear optical medium; and
a second nonlinear optical medium that transmits the light that has been transmitted through the dispersion medium, wherein
the wave coupling unit couples the signal light with pulsed pump light as the pump light,
the dispersion medium has a length that causes relative timing of the signal light and the pulsed pump light traveling through the dispersion medium to shift, and
the dispersion medium has a length that causes an extent of a shift of the timing to be approximately half of a pulse interval of the pulsed pump light.

2. The optical signal processing apparatus according to claim 1, wherein
the dispersion medium and the second nonlinear optical medium are disposed in combination and in plurality downstream from the first nonlinear optical medium, and
the dispersion medium transmits the light transmitted through the first nonlinear optical medium or the second nonlinear optical medium upstream from the dispersion medium.

3. The optical signal processing apparatus according to claim 1, further comprising a polarization adjusting unit that adjusts polarization of the pump light to be coupled by the wave coupling unit to include two circular polarization components having polarization states orthogonal to each other.

4. The optical signal processing apparatus according to claim 1, further comprising a polarization adjusting unit that adjusts polarization of the pump light to be coupled by the wave coupling unit to include two linear polarization components orthogonal to each other.

5. The optical signal processing apparatus according to claim 1, wherein the wave coupling unit couples the signal light with pump light of a power that saturates gain of the signal light in the first nonlinear optical medium and the second nonlinear optical medium, as the pump light.

6. The optical signal processing apparatus according to claim 1, wherein the first nonlinear optical medium and the second nonlinear optical medium are periodically-poled $LiNbO_3$ waveguides each having a pseudo phase matching structure and in which three-wave mixing with respect to the signal light is caused to occur according to the pump light.

7. The optical signal processing apparatus according to claim 1, further comprising a saturable absorbing unit disposed upstream or downstream from at least any one of the first nonlinear optical medium and the second nonlinear optical medium.

8. The optical signal processing apparatus according to claim 1, further comprising:
a power monitoring unit that monitors power of the light input to the first nonlinear optical medium and power of the light that has been transmitted by the second nonlinear optical medium; and
a power control unit that based on a monitoring result from the power monitoring unit, controls power of the signal light and power of the pump light to be coupled by the wave coupling unit.

9. The optical signal processing apparatus according to claim 1, further comprising:
a polarization monitoring unit that monitors a polarization state of the pump light input to the first nonlinear optical medium or to the second nonlinear optical medium; and
a polarization control unit that based on a monitoring result from the polarization monitoring unit, controls a polarization state of the pump light to be coupled with the signal light by the wave coupling unit.

10. An optical receiving apparatus comprising:
the optical signal processing apparatus according to claim 1; and
a receiving unit that receives the light that has been transmitted by the second nonlinear optical medium of the optical signal processing apparatus.

11. An optical relay apparatus comprising:
the optical signal processing apparatus according to claim 1; and
an optical transmitter unit that transmits reshaped signal light output from the second nonlinear optical medium of the optical signal processing apparatus.

* * * * *